Patented Jan. 30, 1923.

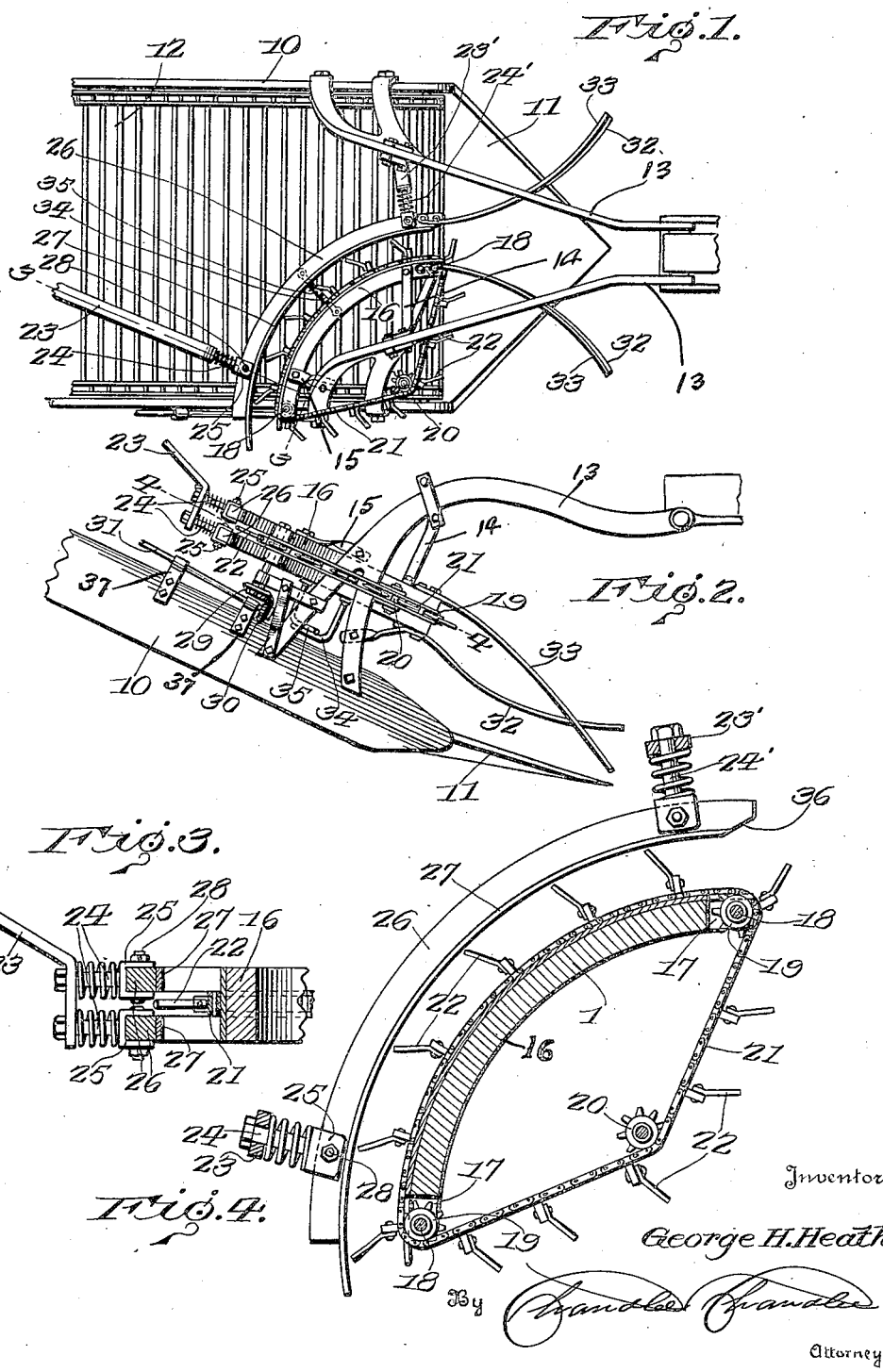

1,443,741

UNITED STATES PATENT OFFICE.

GEORGE H. HEATH, OF HASTINGS, FLORIDA.

VINE SEPARATOR FOR ROOT HARVESTERS.

Application filed June 18, 1921. Serial No. 478,590.

*To all whom it may concern:*

Be it known that I, GEORGE H. HEATH, a citizen of the United States, residing at Hastings, in the county of St. Johns, State of Florida, have invented certain new and useful Improvements in Vine Separators for Root Harvesters; and I do hereby declare the following to be a full, clear, and exact description of the invention, such as will enable others skilled in the art to which it appertains to make and use the same.

This invention relates to new and useful improvements in harvesting machines and particularly to root diggers.

One object of the invention is to provide an attachment for a root digging machine, such as a potato digger, by means of which the vines will be discharged at one side of the machine, while the tubers will be deposited on the elevator.

Another object is to provide an attachment of this character which disposes of the vines at the time when the plants are being transferred from the digging shovel to the elevating belt.

Another object is to provide a device of this character which will properly and efficiently remove the tubers from the vines, and which will be yieldable so as to accommodate an excessive number of vines or weeds without danger of choking.

A further object is to provide a device of this character which can be readily and cheaply applied to diggers now in use without radical modifications to the diggers.

Other objects and advantages will be apparent from the following description when taken in connection with the accompanying drawing.

In the drawing.

Figure 1 is a top plan view of a portion of a potato digger showing the invention applied thereto.

Figure 2 is a side elevation of the same.

Figure 3 is an enlarged vertical transverse sectional view through the attachment, taken on the line 3—3 of Figure 1.

Figure 4 is an enlarged horizontal longitudinal sectional view taken through the arcuate members of the attachment, on the line 4—4 of Figure 2.

Referring particularly to the accompanying drawing, 10 represents the chute of the elevator of a potato digging machine, 11 the shovel thereof, and 12 the conveyor belt.

Secured to the side rails of the chute are the draft beams 13, and carried by one of the beams are the braces 14 and 15, which support the ends of the arcuate bar 16, said bar extending from a point over the center of the lower end of the chute to the side rail thereof, adjacent the said lower end. Each end of the bar 16 carries a vertical bearing bracket 17, and rotatably supported in each bracket is a vertical shaft 18, on which is secured a sprocket wheel 19. Supported by the adjacent leg of the beam 13, is an idler pulley 20, and engaged around the sprocket wheels 19, and the idler 20, is a chain 21, the inner lap of which travels against the convex face of the bar 16. Secured to the links of the chain 21, at regularly spaced intervals, are the outwardly extending gathering fingers 22.

Secured to the machine, over the chute, and above the beam 13, is a forwardly and downwardly extending brace 23, the lower end of which has the bolts 24 disposed therethrough. The forward ends of the bolts 24 are forked, as shown at 25, and each straddles the adjacent portion of an arcuate bar 26. There are two of the bars 26, arranged one above the other, in parallel relation, and in parallel relation to the arcuate bar 16, but spaced horizontally therefrom. These bars 26 are spaced apart a distance sufficient to permit the fingers 22 to readily travel therebetween. On each bolt 24, between its forked end and the brace 23, is a coil spring which normally and resiliently holds the bar 26 in advanced position toward the bar 16. The inner face of each of the bars 26 has secured thereto a metal strip 27, which extends throughout the length of the bar. Each of the forked ends of the bolts is secured to its bar 26 by a vertical bolt 28. It will be noted that the bolts 24 are adapted to slide through the brace 23, so that the bars 26 may move backward under pressure from the plants which are carried between the said bars 26 and the bar 16, by the fingers 22 of the chain 21. The lower end of the rear vertical shaft 18, at 29, has a bevel gear mounted thereon, which is driven by the gear 30 of the drive shaft 31, supported by the brackets 37.

Secured to the lower and upper faces respectively of the forward ends of the bars 16, and 26, and extending in downward and lateral forwardly projecting position, are the gathering arms 32 and 33. The arms 32 and 33 of the bar 16 diverge with respect to the arms 32 and 33 of the bar 26, as clearly seen in Figure 1 of the drawing. These arms 32 and 33 serve to guide the tops of the plants to the deflecting chain 21, as the plants are lifted from the ground and carried upwardly by the conveyor 12.

Secured to the lower side of the intermediate portion of the bar 16 is an L-shaped arm 34, the horizontal portion of which extends transversely toward the corresponding portion of a second L-shaped arm 35, carried by and depending from the lower arcuate bar 26. It will be noted, however, that the horizontal portions of these arms 34 and 35 are disposed in overlapping relation when the parts are in normal position, but when the bars 26 move back under pressure from the vines, these horizontal portions of the members 34 and 35 will still remain to form an angular U. The purpose of these arms 34 and 35 is to engage with the root portions of the vines and strip the potatoes therefrom and permit them to drop onto the endless elevator apron while the vines are carried between the bars 16 and 26, and dropped off at the side of the chute, to the ground. Thus the potatoes are effectively removed from the vines, and the vines discharged in rows on the ground, so that further operation thereon to remove the potatoes is unnecessary.

The device is of such construction that it may be readily applied to the ordinary potato digger, with only the addition of the supporting braces, 14 and 15.

The other end of the arcuate member 26 is supported by the spring pressed bolt 24', carried by the brace 23' of the frame of the machine.

It will also be noted that the inner forward corner of the member 26 is beveled, as shown at 36, to serve as a guide to the plants which enter between the arcuate members.

What is claimed is:

1. An attachment for a root harvester for separating the foliage from the tubers, comprising a pair of spaced foliage guides mounted on the elevator of the harvester and extending from the digger to one side of the elevator, means for carrying the foliage between the guides, and means for scraping the tubers from the roots as the plants pass between the guides.

2. An attachment for a root harvester comprising a pair of parallel curved spaced guides mounted on the harvester and extending from a point over the digging element of the harvester to a point at one side of the elevator of the harvester, an endless conveyor engaged around one of the curved guides for passing the foliage of the plants between the guides, and means on the guides for stripping the tubers from the roots of the plants as the plants pass between the guides, so that the plants will be discharged from the side of the harvester and the tubers dropped onto the elevator of the harvester.

3. An attachment for a root harvester comprising foliage conveying guiding means, gathering means for delivering the foliage to the guides, and depending arms on the guiding means for scraping the tubers from the roots of the plants.

4. An attachment for a root harvester comprising a stationary arcuate guide mounted on the harvester, a resiliently supported curved guide mounted on the harvester in parallel spaced relation to the stationary guide and at one side thereof, and an endless conveyor chain mounted on the stationary guide and provided with fingers for carrying the vines rearwardly and laterally from the havester.

In testimony whereof, I affix my signature, in the presence of two witnesses.

GEORGE H. HEATH.

Witnesses:
R. M. BURT,
H. L. ROBINSON.